United States Patent
Ishii et al.

(10) Patent No.: US 12,205,610 B2
(45) Date of Patent: Jan. 21, 2025

(54) SPEECH IMAGING APPARATUS, SPEECH IMAGING METHOD AND PROGRAM

(71) Applicant: NIPPON TELEGRAPH AND TELEPHONE CORPORATION, Tokyo (JP)

(72) Inventors: Yoko Ishii, Musashino (JP); Momoko Nakatani, Musashino (JP); Ai Nakane, Musashino (JP); Asuka Ono, Musashino (JP); Yumiko Matsuura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 508 days.

(21) Appl. No.: 17/594,396

(22) PCT Filed: Apr. 18, 2019

(86) PCT No.: PCT/JP2019/016596
§ 371 (c)(1),
(2) Date: Oct. 14, 2021

(87) PCT Pub. No.: WO2020/213115
PCT Pub. Date: Oct. 22, 2020

(65) Prior Publication Data
US 2022/0199104 A1  Jun. 23, 2022

(51) Int. Cl.
G06F 16/51 (2019.01)
G10L 15/08 (2006.01)
G10L 21/10 (2013.01)

(52) U.S. Cl.
CPC .............. G10L 21/10 (2013.01); G10L 15/08 (2013.01)

(58) Field of Classification Search
None
See application file for complete search history.

(56) References Cited

U.S. PATENT DOCUMENTS

| | | | |
|---|---|---|---|
| 2017/0068423 A1* | 3/2017 | Napolitano | G06F 16/90332 |
| 2018/0260680 A1* | 9/2018 | Finkelstein | G06N 5/04 |
| 2018/0350370 A1* | 12/2018 | Ding | H04L 12/1831 |
| 2019/0146752 A1* | 5/2019 | Hwang | G06F 16/51 |
| | | | 715/727 |
| 2019/0341055 A1* | 11/2019 | Krupka | G10L 17/08 |
| 2021/0074068 A1* | 3/2021 | Spivack | G06N 20/00 |
| 2021/0158815 A1* | 5/2021 | Lee | G06V 10/764 |
| 2022/0014867 A1* | 1/2022 | Zhao | G06T 7/20 |

FOREIGN PATENT DOCUMENTS

| | | |
|---|---|---|
| JP | 2014-013494 | 1/2014 |
| JP | 2015-100054 | 5/2015 |
| JP | 2017-016296 | 1/2017 |

OTHER PUBLICATIONS

Noriyoshi Kamado et al., "Introduction of noise-robust ASR platform based on HTML5", IPSJ SIG Technical Reports, vol. 2015-SLP-108, No. 3, 2015, pp. 1-6.

* cited by examiner

Primary Examiner — Seong-Ah A Shin
(74) Attorney, Agent, or Firm — IPUSA, PLLC

(57) ABSTRACT

An utterance imaging device reduces a cognitive load on utterance details by extracting some character strings from character strings recognized as sounds from an utterance, acquiring an image based on the some character strings, and outputting the image to a position corresponding to a speaker related to the utterance.

13 Claims, 5 Drawing Sheets

SPEECH IMAGING APPARATUS, SPEECH IMAGING METHOD AND PROGRAM

TECHNICAL FIELD

The present disclosure relates to an utterance imaging device, an utterance imaging method, and a program.

BACKGROUND ART

In the related art, a technique for automatically converting utterance details of a person into text in real time and recording the text has been disclosed (for example, Non Patent Literature 1).

CITATION LIST

Non Patent Literature

Non Patent Literature 1: Kamado, Fujimura, Iwase, Aono, Masataki, Yamada, Otsuya, "Introduction of Noise-robust ASR Platform Based on HTML5," research report sound language information processing (SLP), 2015-SLP-108 (3), pp. 1-6 (2015)

SUMMARY OF THE INVENTION

Technical Problem

According to the technique disclosed in Non Patent Literature 1, when a plurality of persons have a conversation, details of the conversation can be automatically converted into text in real time.

However, having a conversation while confirming the whole conversation as text is a high cognitive load on a listener. For example, in a case where self-introduction is performed, a cognitive load is high even when only utterance details are displayed as text, and thus it is difficult to promote mutual understanding.

The present disclosure is contrived in view of the above-described circumstances, and an object thereof is to reduce a cognitive load of utterance details.

Means for Solving the Problem

Thus, in order to solve the above-described problem, an utterance imaging device includes an extraction unit configured to extract some character strings from character strings recognized as sounds from an utterance, an acquisition unit configured to acquire an image based on the some character strings, and an output unit configured to output the image to a position corresponding to a speaker related to the utterance.

Effects of the Invention

It is possible to reduce a cognitive load of utterance details.

DESCRIPTION OF EMBODIMENTS

Figure 1:
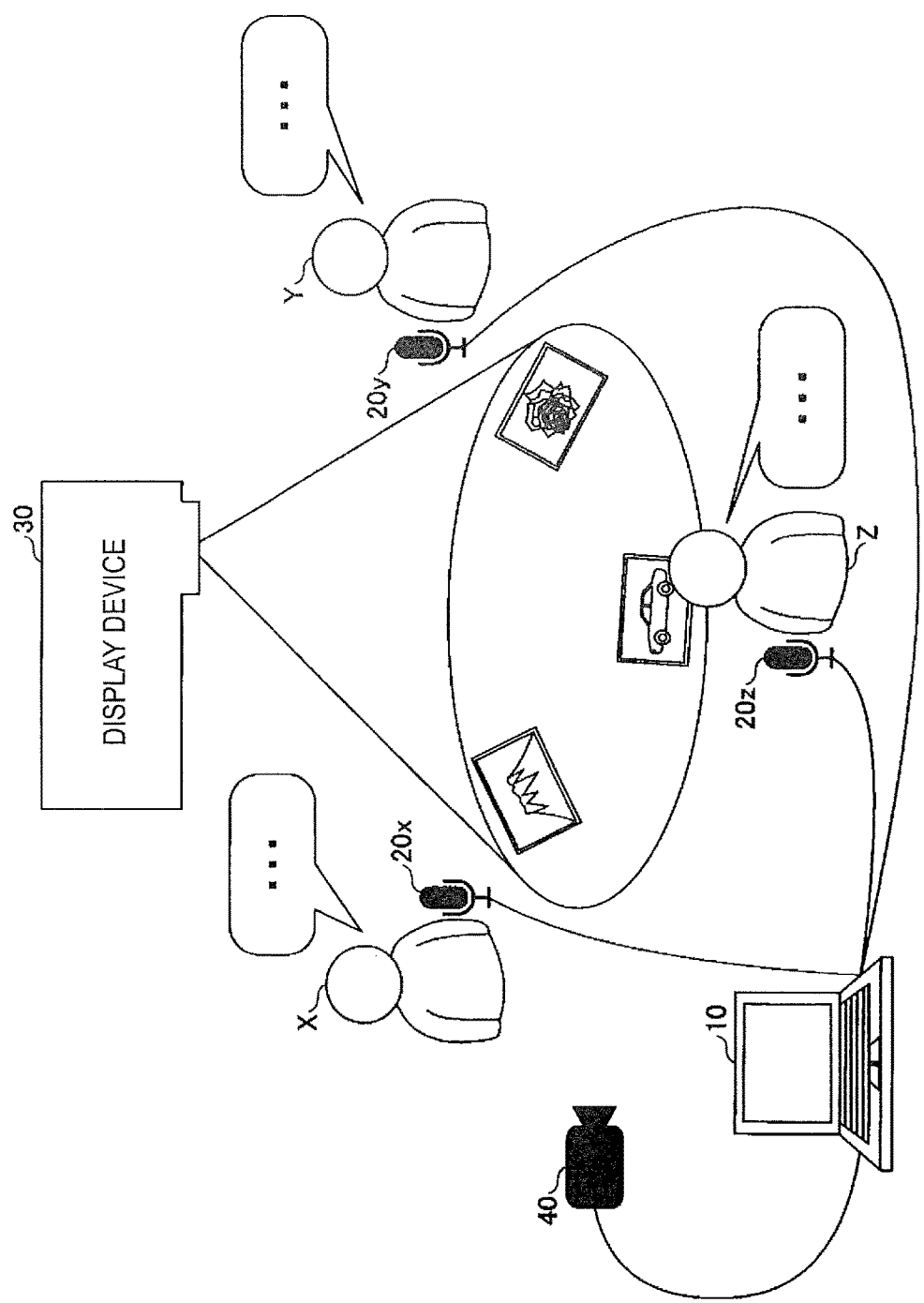
FIG. 1 is a diagram illustrating an example of a system configuration in an embodiment of the present disclosure.

An embodiment of the present disclosure will be described below with reference to the drawings. FIG. 1 is a diagram illustrating an example of a system configuration in an embodiment of the present disclosure. As illustrated in FIG. 1, in the embodiment, sound collecting devices 20x, 20y, and 20z such as a microphone (hereinafter referred to simply as a "sound collecting device 20" in a case where the sound collecting devices are not distinguished from each other), a display device 30 such as a projector (projection device), an utterance imaging device 10 such as a personal computer (PC), and a display device 30 such as a projector are used. In addition, an imaging device 40 may be used as necessary. A sound collecting device 20, a display device 30, and an imaging device 40 are each connected to an utterance imaging device 10 through interfaces corresponding to the respective devices. The sound collecting device 20 is installed for each of a plurality of persons having a conversation with each other (hereinafter referred to as "participants"). In the embodiment, an example in which a conversation is performed by three persons, that is, a participant X, a participant Y, and a participant Z, and is visualized will be described. Accordingly, three sound collecting devices 20 are installed. However, the embodiment may be applied to a case where a conversation is performed by two or four or more persons. Note that, in the embodiment, a scene in which self-introduction is performed is assumed as a scene of the conversation. As such, the participant X, the participant Y, and the participant Z, for example, all sit in a circle facing each other and take turns speaking (introducing themselves). Thus, one person speaks at any given moment. However, details of a conversation may not be self-introduction. In addition, a positional relationship between the participants is not limited to sitting in a circle.

Each of the sound collecting devices 20 receives a sound signal of a sound of the corresponding participant (the participant X, the participant Y, or the participant Z) as an input.

The display device 30 outputs an image based on details of an utterance made by a speaker.

The imaging device 40 images the states of the participant X, the participant Y, and the participant Z. Note that a plurality of imaging devices 40 may be used in a case where all of the participants cannot be imaged by one imaging device 40, and the like.

Figure 2:
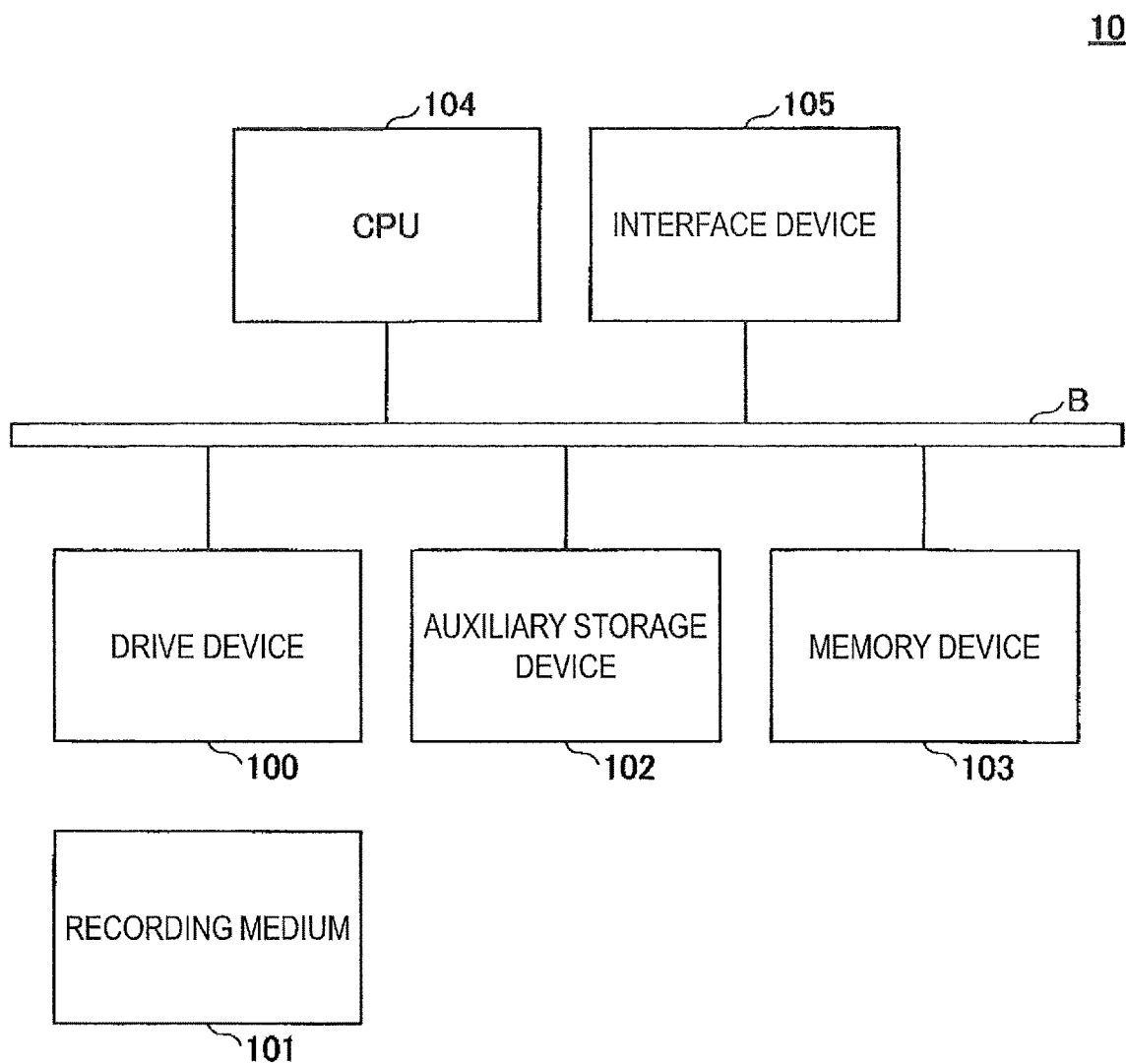
FIG. 2 is a diagram illustrating an example of a hardware configuration of an utterance imaging device 10 in the embodiment of the present disclosure.

FIG. 2 is a diagram illustrating an example of a hardware configuration of the utterance imaging device 10 in the embodiment of the disclosure. The utterance imaging device 10 of FIG. 2 includes a drive device 100, an auxiliary storage device 102, a memory device 103, a CPU 104, and an interface device 105 that are connected to each other through a bus B.

A program that realizes processing in the utterance imaging device 10 is provided by a recording medium 101 such as a CD-ROM. When the recording medium 101 in which a program is stored is set in the drive device 100, the program is installed in the auxiliary storage device 102 from the recording medium 101 through the drive device 100. However, the program is not necessarily installed by the recording medium 101, and may be downloaded from another computer through a network. The auxiliary storage device 102 stores the installed program and stores necessary files, data, and the like.

In a case where an instruction for starting a program has been given, the memory device 103 reads the program from the auxiliary storage device 102 and stores the program. The CPU 104 executes a function related to the utterance imaging device 10 according to the program stored in the memory device 103. The interface device 105 is used as an interface for connection to a network.

Figure 3:
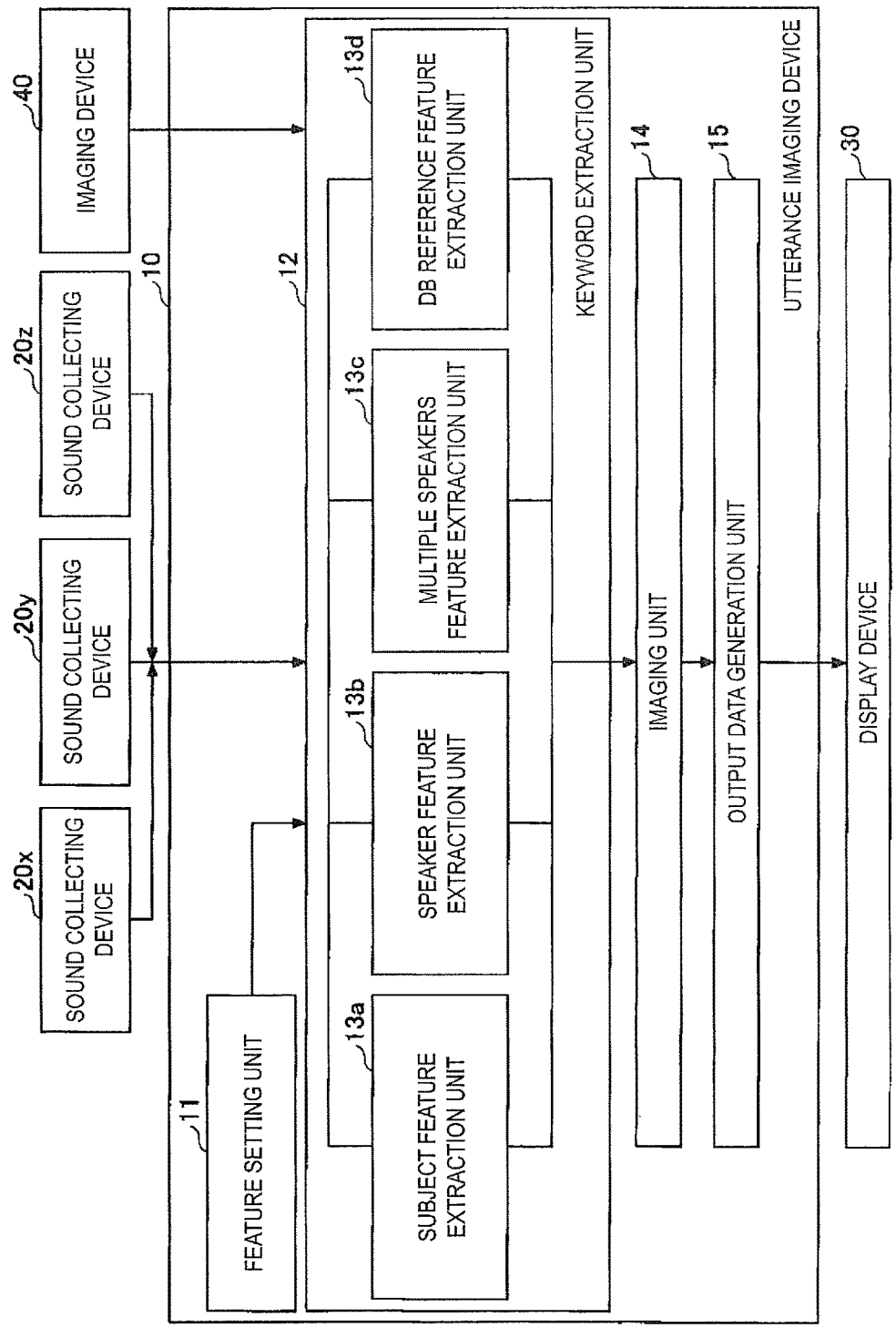
FIG. 3 is a diagram illustrating an example of a functional configuration of the utterance imaging device 10 in the embodiment of the present disclosure.

FIG. 3 is a diagram illustrating an example of a functional configuration of the utterance imaging device 10 in the embodiment of the present disclosure. In FIG. 3, the utterance imaging device 10 includes, for example, a feature setting unit 11, a keyword extraction unit 12, an imaging unit 14, and an output data generation unit 15. These units are realized by processing executed by the CPU 104 in accordance with one or more programs installed in the utterance imaging device 10. However, these units may not be mounted in the same computer. These units may be distributed and mounted in a plurality of computers. That is, the utterance imaging device 10 may be constituted by one or a plurality of computers.

Hereinafter, a processing procedure executed by each unit will be described.

Feature Setting Unit 11

The feature setting unit 11 receives the setting of setting information (what, how much) indicating conditions for extracting (or detecting) candidates for a keyword from an utterance from a user. It is only required that the user's setting of setting information is performed once before the keyword extraction unit 12 is operated. However, in a case where the setting information is changed, the feature setting unit 11 may perform the reception of setting information from the user again. Note that the setting information may be stored, for example, in the auxiliary storage device 102 or the like.

Setting details regarding "what" is extracted as a keyword may be designated by, for example, a part of speech.

With regard to "how much," for example, extracting N keywords may be set each time a speaker changes is set. Here, in a case where a certain speaker speaks for a long period of time, a keyword is not extracted from an utterance after N keywords are extracted. N can be freely set. In addition, extracting N keywords in order from a keyword having a high appearance frequency, or conversely, a keyword having a low appearance frequency from one speaker's utterances for a fixed period of time may be set as setting details. In this case, N keyword candidates are extracted each time a fixed period of time set in advance elapses after a speaker changes. In a case where three candidates in descending order of an appearance frequency and three candidates in ascending order of an appearance frequency are set as setting details, three candidates are extracted every time a fixed period of time elapses, that is, a total of six keyword candidates are extracted. A time and the number to be set can be freely set.

Further, "when" may be able to be set in addition to "what" and "how much." For example, the magnitude of a sound volume of the whole conversation may be compared with a threshold value, and setting may be performed such that a sound in a period in which sound volume exceeds a certain threshold value (assuming a climax of a conversation), or conversely, a period in which a sound volume is less than a certain threshold value (assuming that there is a person who cannot hear the sound) is set to be an object from which a candidate for a keyword is to be extracted.

Keyword Extraction Unit 12

The keyword extraction unit 12 extracts candidates for a keyword by using setting information, sound data received by the sound collecting devices 20, video data acquired by the imaging device 40, and the like as inputs, and outputs the extracted candidates for the keyword. The candidates for the keyword are candidates for a keyword (that is, some character strings of text indicated by sound data) which matches setting information from text (character strings) indicated by sound data in a certain period of time (for example, a predetermined period from the change of a speaker).

When sound data is input from any one sound collecting device 20, the keyword extraction unit 12 specifies which participant a speaker related to the sound data is. For example, the keyword extraction unit 12 specifies a participant corresponding to the sound collecting device 20 of which the sound volume is larger than a threshold value set in advance for a fixed period of time and the sound volume is largest among pieces of sound data input from the sound collecting devices 20 as a speaker. Correspondence information between the sound collecting device 20 and the participant may be stored in advance in, for example, the auxiliary storage device 102. Note that, in a case where a sound volume related to a participant other than a speaker satisfies the above-described conditions in a state where the speaker is specified, the keyword extraction unit 12 specifies the participant as a new speaker (that is, detects a change of the speaker).

However, a device that explicitly indicates a speaker, such as a talking stick, may be used to detect a change of the speaker. In this case, the keyword extraction unit 12 specifies a participant holding the talking stick as a speaker and detects a change of the speaker when the person holding the talking stick changes. Who is holding the talking stick may be determined based on image recognition performed on video data by the imaging device 40, or may be manually input to the utterance imaging device 10.

Subsequently, the keyword extraction unit 12 extracts keywords matching the setting information from the sound data which is a specification target of the speaker (including the case of rotation). The sound data is sound data for a predetermined period of time after the sound collecting device 20 starts to receive the sound data. The predetermined period of time is, for example, a period of time until a condition included in setting information is satisfied or a period of time until the change of a speaker is detected.

First, the keyword extraction unit 12 converts the sound data into text data. As a technique for conversion, a sound recognition engine or the like may be used. In one example, an example in which an API capable of using a sound recognition engine on a cloud in a web browser is used is shown. In this case, a sound can be converted into text in real time by transmitting sound data from a web browser opened in the utterance imaging device 10. The sound recognition engine performs morphological analysis on data converted into text and responds to text data including results of sound recognition in the form of estimating the part of speech of each word. The keyword extraction unit 12 extracts one or more keyword groups (referred to as "keyword groups" also in a case where the number of corresponding keywords is one) which match setting information from the text data and outputs the extracted keyword groups and identification information (hereinafter referred to as "a participant ID") of a participant who is a speaker.

Each of a subject feature extraction unit 13*a*, a speaker feature extraction unit 13*b*, a multiple speakers feature extraction unit 13*c*, and a DB reference feature extraction unit 13*d* receives a keyword group (hereinafter referred to as a "keyword group W1") output from the keyword extraction unit 12 as an input, extracts a group of one or more keywords (hereinafter referred to as a "keyword group W2") highly related to feature information which is set for each of the units from the keyword group W1, and outputs the extracted keyword group W2. That is, the keyword group W2 is a subset of the keyword group W1. The degree of relevance may be determined by comparing the degree of association between a keyword and feature information with a threshold value. In this case, the threshold value can be arbitrarily set. An example of the feature information includes a word and a sentence.

Subject Feature Extraction Unit 13*a*

When the keyword group W1 is output from the keyword extraction unit 12, the subject feature extraction unit 13*a* may read, for example, feature information previously registered in the auxiliary storage device 102 from the auxiliary storage device 102 as feature information for the subject feature extraction unit 13*a*. The feature information for the subject feature extraction unit 13*a* is a word or a sentence including a noun that is likely to be a subject or a topic, such as a hobby or a place to go out.

In a case where one or more words (hereinafter referred to as "feature words") are registered as feature information, the subject feature extraction unit 13*a* extracts the keyword group W2 from the keyword group W1 in accordance with any one procedure of the following two examples: <First example in case of word> and <Second example in case of word>.

First Example in Case of Word

The subject feature extraction unit 13*a* calculates a thesaurus distance (concept distance) from each feature word as the degree of association for each keyword included in the keyword group W1, and calculates a total value of the degrees of association with respective feature words for each keyword. The thesaurus distance (concept distance) may be calculated, for example, using WordNet. Note that the value of the thesaurus distance decreases as the degree of association increases, and the value of the thesaurus distance increases as the degree of association decreases. The subject feature extraction unit 13*a* extracts a keyword for which the total value is less than a threshold value as the keyword group W2 and outputs the extracted keyword.

Second Example in Case of Word

A vector space of word data is constructed in advance using machine learning. The subject feature extraction unit 13*a* acquires a distributed expression in the vector space using, for example, an algorithm of machine learning such as word2vec for each of keywords included in the keyword group W1 and feature words. Thereby, it is possible to convert the keywords and the feature words into numerical values of multi-dimensional vector data. The subject feature extraction unit 13*a* calculates a Euclidean distance between a distributed expression of a keyword and a distributed expression of each feature word as the degree of association for each keyword included in the keyword group W1, and calculates a total value of the degrees of association with the respective feature words for each keyword. Note that the value of the Euclidean distance decreases as the degree of association increases, and the value of the Euclidean distance increases as the degree of association decreases. The subject feature extraction unit 13*a* extracts a keyword for which the total value is less than a threshold value as the keyword group W2 and outputs the extracted keyword.

On the other hand, in a case where one or more sentences (hereinafter referred to as "feature sentences") are registered as feature information, the subject feature extraction unit 13*a* extracts the keyword group W2 from the keyword group W1 in accordance with any one procedure of the following two examples: <First example in case of sentence> and <Second example in case of sentence>.

First Example in Case of Sentence

First, the subject feature extraction unit 13*a* performs morphological analysis on a feature sentence and divides the feature sentence in units of words. The subject feature extraction unit 13*a* extracts, for example, only nouns as feature words among the separate words. For example, as subjects that are often used in conversations such as self-introduction, sentences such as "Please respond with your favorite food" and "Please respond with a place you often go" are considered as examples. In this case, words such as "food" and "place" are extracted as feature words. The subject feature extraction unit 13*a* calculates a thesaurus distance (concept distance) from each feature word as the degree of association for each keyword included in the keyword group W1, and calculates a total value of the degrees of association with respective feature words for each keyword. The subject feature extraction unit 13*a* extracts a keyword for which the total value is less than a threshold value as the keyword group W2 and outputs the extracted keyword.

Second Example in Case of Sentence

A vector space of word data is constructed in advance using machine learning. The subject feature extraction unit 13*a* acquires a distributed expression in the vector space using, for example, an algorithm of machine learning such as doc2vec for each of keywords included in the keyword group W1 and feature sentences. Note that, in a case where a distributed expression of a feature sentence is acquired, morphological analysis is performed on the feature sentence and divided into word groups. It is possible to convert the feature sentence into a distributed expression by passing the word groups to a doc2vec algorithm. The subject feature extraction unit 13*a* calculates a Euclidean distance between a distributed expression of a keyword and a distributed expression of each feature word as the degree of association for each keyword included in the keyword group W1, and calculates a total value of the degrees of association with the respective feature words for each keyword. The subject feature extraction unit 13*a* extracts a keyword for which the total value is less than a threshold value as the keyword group W2 and outputs the extracted keyword.

According to the subject feature extraction unit 13*a*, a keyword having a relatively high relevance to a feature of a subject is extracted as the keyword group W2. Note that both a feature word and a feature sentence may be registered as feature information.

Speaker Feature Extraction Unit 13*b*

When the keyword group W1 and the participant ID are output from the keyword extraction unit 12, the speaker feature extraction unit 13b may read, for example, feature information corresponding to the participant ID among feature information previously registered by participants in the auxiliary storage device 102 from the auxiliary storage device 102, as feature information for the speaker feature extraction unit 13b. The feature information for the speaker feature extraction unit 13b is, for example, personal information of a speaker, and is a word (feature word) or a sentence (feature sentence) including information representing an individual such as a place of residence of the speaker himself or herself and profiles or hobbies of family members.

In a case where one or more feature words are registered as feature information, the speaker feature extraction unit 13b extracts the keyword group W2 from the keyword group W1 in accordance with any one procedure of the above-described two examples: <First example in case of word> and <Second example in case of word>.

On the other hand, in a case where one or more feature sentences are registered as feature information, the speaker feature extraction unit 13b extracts the keyword group W2 from the keyword group W1 in accordance with any one procedure of the above-described two examples: <First example in case of sentence> and <Second example in case of sentence>. However, as an example of a feature sentence for the speaker feature extraction unit 13b, "I like surfing in Shonan," "playing the piano," and the like are considered. In this case, "Shonan," "surfing," "piano," and the like are acquired as feature words from these feature sentences through morphological analysis.

According to the speaker feature extraction unit 13b, a keyword having a relatively high relevance to a feature of a speaker is extracted as the keyword group W2. Note that both a feature word and a feature sentence may be registered as feature information.

Multiple Speakers Feature Extraction Unit 13c

When the keyword group W1 is output from the keyword extraction unit 12, the multiple speakers feature extraction unit 13c may read, for example, feature information for all participants among pieces of feature information previously registered by participants in the auxiliary storage device 102 from the auxiliary storage device 102, as the above-described feature information for the speaker feature extraction unit 13b.

In a case where one or more feature words are registered as feature information, the multiple speakers feature extraction unit 13c extracts the keyword group W2 from the keyword group W1 based on feature information common to the participants (strictly, the pieces of feature information may not completely match each other), in accordance with any one procedure of the following two examples, that is, <Third example in case of word> and <Fourth example in case of word> after the following <common processing> is executed.

<Common Processing>

First, the multiple speakers feature extraction unit 13c generates all combinations each including one feature word of each participant, and groups the combinations. That is, the groups are generated such that at least one or more feature words are different between the groups. In a case where there are three participants as in the embodiment, each group includes three feature words, that is, any one feature word of the participant X, any one feature word of the participant Y, and any one feature word of the participant Z.

Next, the multiple speakers feature extraction unit 13c obtains the sum of thesaurus distances between all feature words belonging to a group for each group. For example, in the case of a group including a feature word a, a feature word b, and a feature word c, a total value of thesaurus distances between a and b, between b and c, and between c and a is calculated.

Subsequently, the multiple speakers feature extraction unit 13c extracts a feature word belonging to a group in which a total value of thesaurus distances is equal to or less than a threshold value, as feature information common to the participants.

Third Example in Case of Word

The multiple speakers feature extraction unit 13c performs the same processing procedure as that in <First example in case of word> described above except that a feature word extracted as "feature information common to participants" is used in the common processing, and extracts the keyword group W2 from the keyword group W1.

Fourth Example in Case of Word

The multiple speakers feature extraction unit 13c performs the same processing procedure as that in <Second example in case of word> described above except that a feature word extracted as "feature information common to participants" is used in the common processing, and extracts the keyword group W2 from the keyword group W1.

On the other hand, in a case where a feature sentence is registered for each participant as feature information, the multiple speakers feature extraction unit 13c performs morphological analysis on the feature sentence of each participant to extract nouns from the feature sentences. Next, the multiple speakers feature extraction unit 13c executes <Third example in case of word> and <Fourth example in case of word> subsequently to the above-described common processing> using the extracted nouns as feature words to extract the keyword group W2 from the keyword group W1. Thus, for example, in a case where all of the participants have a common feature such as "having a child as a family member", a keyword having a relatively high relevance to the feature is included in the keyword group W2.

When the processing of the multiple speakers feature extraction unit 13c is performed, a keyword having a relatively high relevance to a feature common to all of the participants is extracted as the keyword group W2. Note that both a feature word and a feature sentence may be registered as feature information.

Incidentally, a keyword group extracted by the multiple speakers feature extraction unit 13c is a subset of a keyword group extracted by the speaker feature extraction unit 13b. Thus, the multiple speakers feature extraction unit 13c and the speaker feature extraction unit 13b may be able to be selectively used. For example, a user may be able to set which one of the multiple speakers feature extraction unit 13c and the speaker feature extraction unit 13b is used. In this case, a unit that can be used may execute processing.

DB Reference Feature Extraction Unit 13d

When the keyword group W1 is output from the keyword extraction unit 12, the DB reference feature extraction unit 13d may read, for example, feature information previously registered in a predetermined database from the database as feature information for the DB reference feature extraction unit 13d. The feature information for the DB reference feature extraction unit 13d is a word (feature word) or a sentence (feature sentence) related to a subject of a conversation excited before. However, the feature information for the DB reference feature extraction unit 13*d* is not limited to a predetermined one.

In a case where one or more feature words are registered as feature information, the DB reference feature extraction unit 13*d* extracts the keyword group W2 from the keyword group W1 in accordance with any one procedure of the above-described two examples, that is, <First example in case of word> and <Second example in case of word>.

On the other hand, in a case where one or more feature sentences are registered as feature information, the speaker feature extraction unit 13*b* extracts the keyword group W2 from the keyword group W1 in accordance with any one procedure of the above-described two examples, that is, <First example in case of sentence> and <Second example in case of sentence>.

The processes of the subject feature extraction unit 13*a*, the speaker feature extraction unit 13*b* or the multiple speakers feature extraction unit 13*c*, and the DB reference feature extraction unit 13*d* may be performed in series or may be performed in parallel.

Imaging Unit 14

The imaging unit 14 acquires an image based on the keyword groups W2 by any one of the following methods 1 to 3 using the keyword group W2 output from the subject feature extraction unit 13*a*, the keyword group W2 output from the speaker feature extraction unit 13*b* or the multiple speakers feature extraction unit 13*c*, and the keyword group W2 output from the DB reference feature extraction unit 13*d* as inputs, and outputs the image. Note that, here, a result obtained by eliminating duplication from a logical sum of the keyword groups W2 is referred to as a keyword group W3.

<Method 1>

Text data having any font is generated for each keyword included in the keyword group W3, and the text data is imaged.

<Method 2>

An image is retrieved using each keyword included in the keyword group W3 through, for example, the Internet, and one image is selected (acquired) from among the retrieved image group for each keyword. Thus, in a case where a plurality of keywords are included in the keyword group W3, a plurality of images are acquired.

<Method 3>

The images selected by the method 2 are processed, and processing results are output. For example, an image in which a portion (partial region) of the image is cut out or only the contour of an object included in the image is extracted may be generated.

Note that, in a case where a large number of keywords (for example, a number equal to or greater than a threshold value) are included in the keyword group W3, the imaging unit 14 may execute the following processing in order to narrow down keywords to be imaged.

The imaging unit 14 calculates a thesaurus distance between keywords (all combinations of two keywords) included in the keyword group W3 using WordNet and groups keywords for which a thesaurus distance is less than a threshold value. The imaging unit 14 selects two groups in order from a group which has the largest number of keywords belonging thereto from among the groups, and randomly selects one keyword from each selected group to set the selected keyword as an object to be imaged. Note that the same keyword may belong to a plurality of groups at the time of grouping. In order to avoid this, a keyword selected from a certain group may be only required not to be selected in another group. The threshold value of the thesaurus distance and the number of groups to be selected can be freely set. Alternatively, one keyword may be randomly set as an object to be imaged.

In addition, with regard to the method 2 or the method 3, the imaging unit 14 may set a keyword obtained by taking a logical product of the keyword groups W2 (that is, extracting keywords that are included in all of the keyword groups W2 in common) as an object to be imaged. Alternatively, with regard to the method 2 or the method 3, the imaging unit 14 may set a keyword obtained by grouping the keyword groups W3 as described above, selecting two groups in order from a group which has the largest number of keywords belonging thereto, randomly selecting one keyword from the selected groups, and taking a logical product of the keywords selected from the groups, as an object to be imaged.

Note that which one of the methods 1, 2, and 3 is executed, a method of narrowing down keywords to be imaged, and the like may vary depending on which participant is a speaker.

Output Data Generation Unit 15

The output data generation unit 15 generates image data to be described below by using image data output from the imaging unit 14 (hereinafter referred to as an "utterance image"). The above-described image data is image data for outputting (projecting) the utterance image by the display device 30 (hereinafter referred to as "output data") in a state where the utterance image is rotated in a direction based on a positional relationship between a speaker and the others (participants other than the speaker).

First, the output data generation unit 15 specifies the position of each participant. For example, the output data generation unit 15 may specify the position of each participant by applying known image processing to an image obtained from the imaging device 40.

Subsequently, the output data generation unit 15 specifies the position of the speaker. For example, it is assumed that the positions of the sound collecting devices 20 are known (for example, positional information of the sound collecting devices 20 may be stored in the auxiliary storage device 102). The output data generation unit 15 specifies a position closest to the position of the sound collecting device 20 related to the speaker, among the positions specified for the respective participants, as the position of the speaker.

Subsequently, the output data generation unit 15 specifies a point closest to the speaker on the circumference of the largest ellipse within a projection range of the display device 30 as a reference point of a position where the utterance image is disposed (hereinafter referred to as a "disposition reference point"). Alternatively, it is assumed that participants are sitting in a circle, and thus a position closest to the position of a speaker may be set as a disposition reference point after the order of arrangement of participants is set in advance and positions corresponding to the respective participants are equally specified in order of arrangement of the participants on the circumference of the largest ellipse within a projection range of the display device 30.

Figure 4:
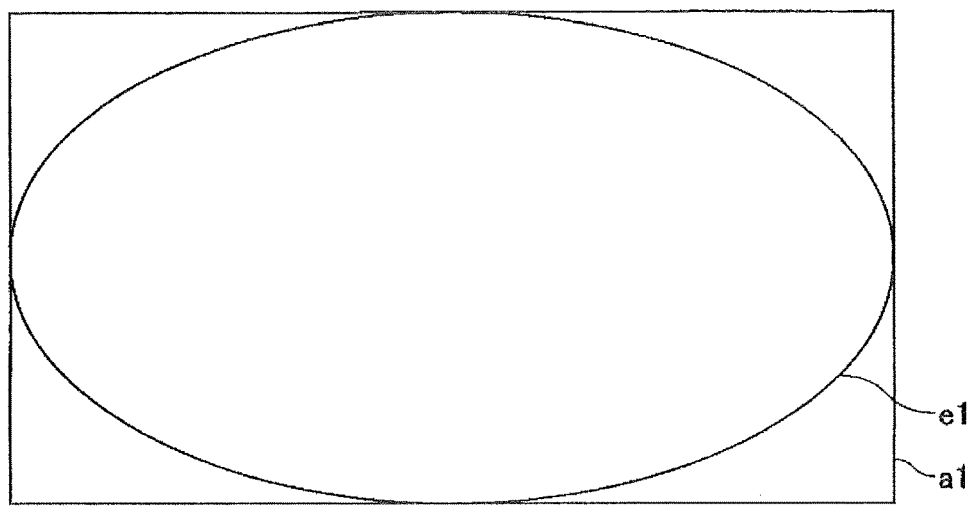
FIG. 4 is a diagram illustrating a largest ellipse within a projection range.

FIG. 4 is a diagram illustrating the largest ellipse within a projection range. In FIG. 4, a largest ellipse e1 is illustrated in a projection range a1.

Subsequently, the output data generation unit 15 generates output data so that an utterance image is projected in a state where the utterance image is rotated in a direction that aligns with the position of a participant (another person) other than a speaker (that is, a state where the utterance image is easily visible to another person). When the output data is generated, the output data generation unit 15 determines the position of the utterance image in the projection range (output data) so that a disposition reference point and the center of the utterance image are as close as possible in a range in which a state where the entirety of the utterance image is included in the projection range of the display device 30 is secured. The utterance image is disposed near the speaker to make it easy for another person to remember utterance details of the speaker by associating the speaker with the utterance image.

In addition, it is assumed that the utterance image is displayed for another person (a lower side of details of the utterance image faces the other person), and thus the output data generation unit 15 rotates and disposes a target image based on, for example, a positional relationship with the center of the largest ellipse within the projection range of the display device 30. For example, the target image is rotated and disposed so that the base (side on the lower side) of the target image faces the center.

Note that, in a case where there are a plurality of utterance images, all of the utterance images may be displayed at the same time, or one or more of the utterance images may be displayed in order with a time difference.

The output data generation unit 15 outputs the output data generated as described above to the display device 30. As a result, the output data is output (projected) by the display device 30.

Figure 5:
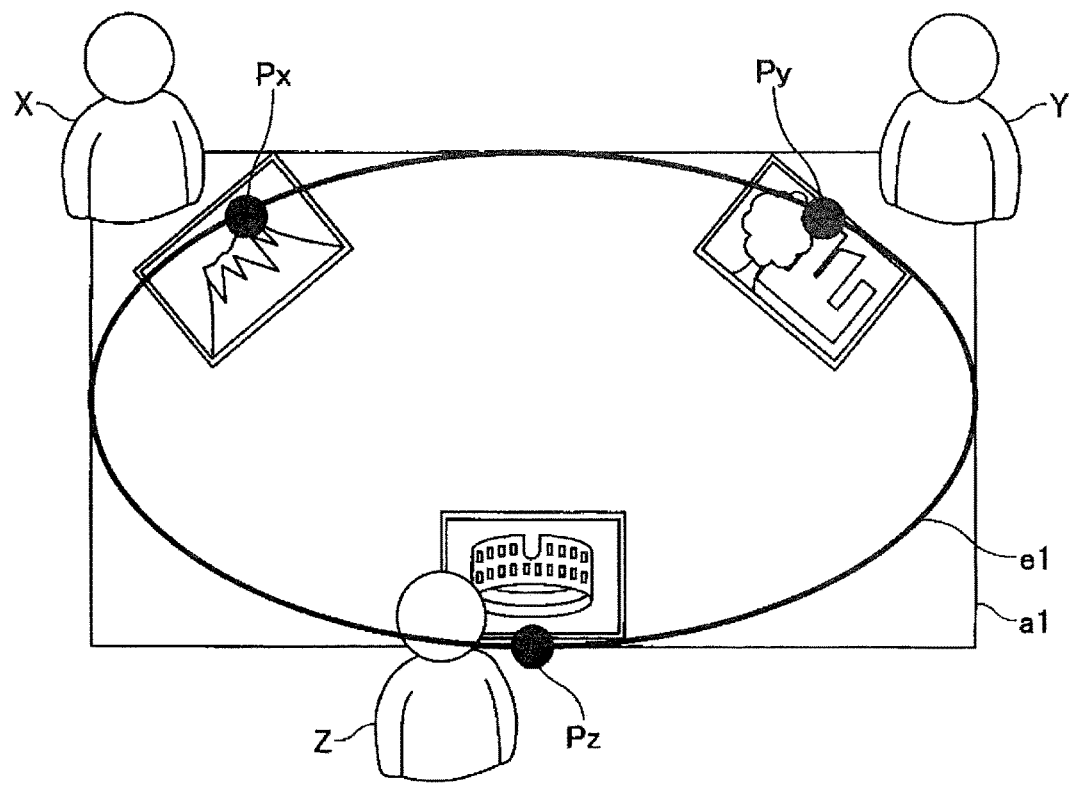
FIG. 5 is a diagram illustrating a first output example of an utterance image.

FIG. 5 is a diagram illustrating a first output example of an utterance image. In FIG. 5, the same portions as those in FIG. 1 or 4 are denoted by the same reference numerals and signs. In FIG. 5, an example in which a maximum of one speaker image is output for each participant is illustrated. That is, according to the processing procedure described above, when a certain participant utters (speaks), a state where an utterance image based on details of the utterance is output at any time is reproduced. In the example of FIG. 4, when a new utterance image is output, the past utterance image of a participant (that is, a speaker) related to the utterance image is deleted. However, utterance images of others are left. Note that FIG. 5 illustrates a disposition reference point Px specified when a participant X is a speaker, a disposition reference point Py specified when a participant Y is a speaker, and a disposition reference point Pz specified when a participant Z is a speaker.

Figure 6:
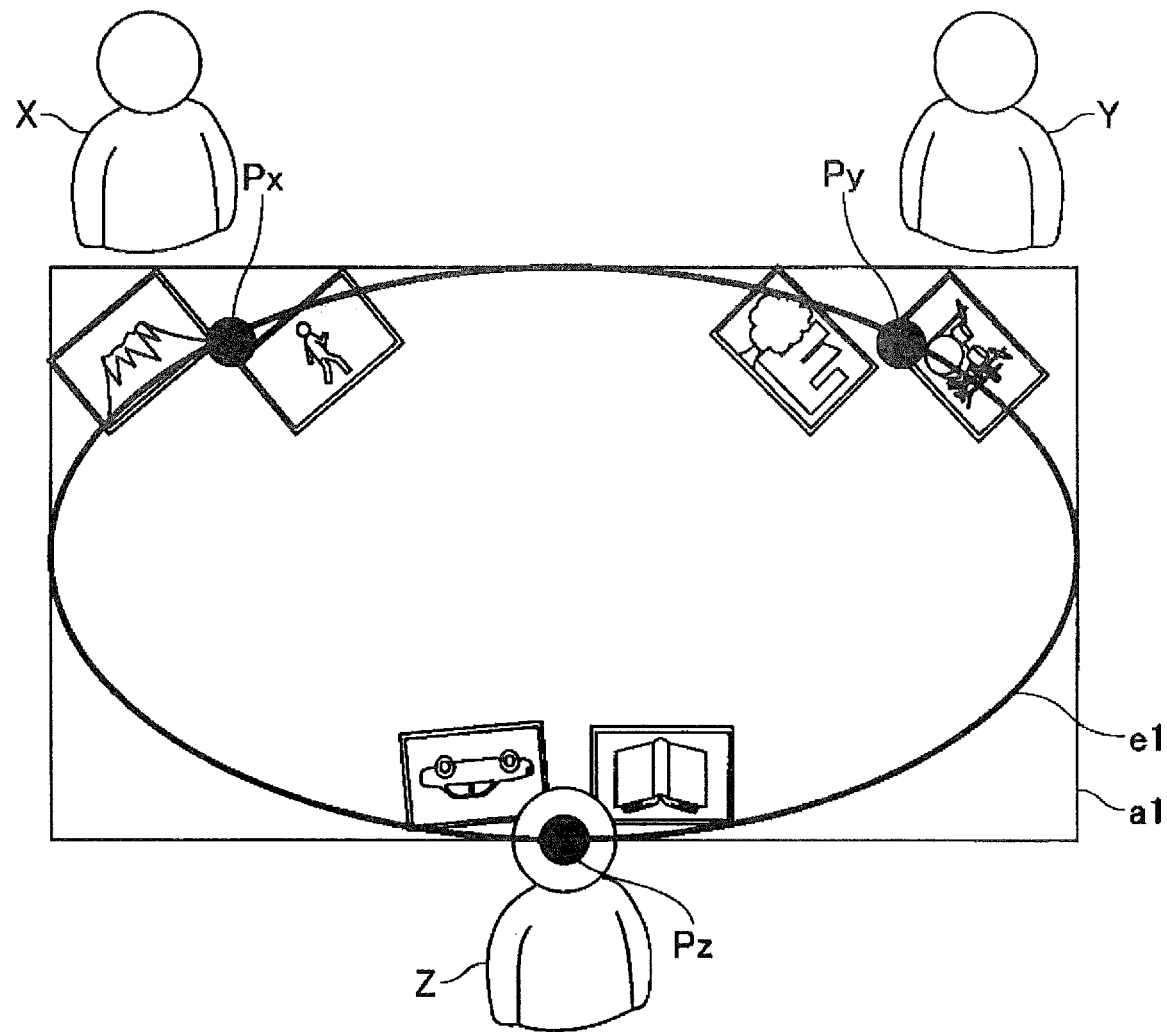
FIG. 6 is a diagram illustrating a second output example of an utterance image.

FIG. 6 is a diagram illustrating a first output example of an utterance image. In FIG. 6, the same portions as those in FIG. 5 are denoted by the same reference numerals and signs. In the example of FIG. 6, the position of the past utterance image is shifted when a new utterance image is output. As a result, a plurality of utterance images can be output for each participant. However, in a case where an upper limit is set for the number of utterance images left as targets to be output and the number exceeds the upper limit, the oldest utterance image may be removed from targets to be output.

In any one of the examples of FIGS. 5 and 6, the base of a speaker image of each participant is projected to face the center of an ellipse a1. As a result, each speaker image is displayed in a state of being easily visible from others.

Note that an example in which an utterance image based on utterance details is output in real time has been described above, but sound recording data in which utterance details are recorded or image recording data in which the state of a conversation is recorded may be used to implement the embodiment. In this case, a position where the utterance image is output may be appropriately determined.

In addition, an example of self-introduction has been described above, but the embodiment may be applied in a scene in which a plurality of persons speak substantially simultaneously as in a discussion, instead of a form in which a plurality of persons speak in order. In this case, the above-described processing procedure may be performed for each of the sound collecting devices 20. In this manner, utterance images of the respective participants can be output substantially simultaneously.

In addition, the embodiment may be applied in a situation where one person is a speaker as in the case of presentation. In this case, others are not necessarily sitting in a circle. Thus, an utterance image may be output in a rotated state so as to be easily viewed from the directions of the others' seats.

Further, an example in which the display device 30 is a projection device (projector) has been described in the embodiment. However, for example, a tablet terminal which is the display device 30 may be disposed facing upward in the vicinity of a participant (in front of the participant, or the like) for each participant, or a liquid crystal display which is the display device 30 may be disposed facing another person. In this case, the output data generation unit 15 may output data to the display device 30 corresponding to a speaker.

As described above, according to the embodiment, a portion of utterance details of a speaker is output as an image. The image can visually promote the understanding of utterance details, and thus a cognitive load of the utterance details can be reduced.

In addition, a portion (keyword) which is imaged among the utterance details is extracted based on features obtained from a subject of a conversation, information obtained from features of an individual speaker, information obtained from features of a plurality of speakers, information obtained from features stored in a database in advance, and the like. Thus, principal keywords (keywords that are likely to give the impression of utterance details to others) can be imaged.

Note that, in the embodiment, the setting information and the feature information are examples of predetermined conditions. The keyword extraction unit 12, the subject feature extraction unit 13*a*, the speaker feature extraction unit 13*b*, the multiple speakers feature extraction unit 13*c*, and the DB reference feature extraction unit 13*d* are examples of an extraction unit. The imaging unit 14 is an example of an acquisition unit. The output data generation unit 15 is an example of an output unit.

Although an embodiment of the present disclosure has been described above in detail, the present disclosure is not limited to such a specific embodiment, and various modifications or changes can be made within the scope of the gist of the present disclosure described in the claims.

REFERENCE SIGNS LIST

10 Utterance imaging device
11 Feature setting unit
12 Keyword extraction unit
13*a* Subject feature extraction unit
13*b* Speaker feature extraction unit
13*c* Multiple speakers feature extraction unit
13*d* DB reference feature extraction unit
14 Imaging unit
15 Output data generation unit
20 Sound collecting device
30 Display device
40 Imaging device 100 Drive device
101 Recording medium
102 Auxiliary storage device
103 Memory device
104 CPU
105 Interface device
B Bus

The invention claimed is:

1. An utterance imaging device comprising:
a processor; and
a memory that includes instructions, which when executed, cause the processor to execute:
determining positions of a plurality of speakers;
detecting sounds from at least one speaker of the plurality of speakers;
determining a closest speaker to the detected sounds, the closest speaker being determined from among the plurality of speakers;
determining sounds from the closest speaker;
extracting from the sounds from the closest speaker, using machine learning, a keyword from character strings recognized as sounds from an utterance, the character strings recognized as sounds comprising a vector space of character strings constructed using machine learning, the keyword having a relevance to a feature common to all of the plurality of speakers;
acquiring an image based on the extracted keyword; and
outputting the image to a position corresponding to the closest speaker related to the utterance, wherein the outputting the image includes outputting the image in a state where the image is rotated to align with the determined position of a speaker other than the closest speaker from among the plurality of speakers.

2. The utterance imaging device according to claim 1, wherein the image is an image in which the keyword is imaged or an image retrieved based on the keyword.

3. The utterance imaging device according to claim 1, wherein the extracting further includes extracting character strings matching a predetermined condition as the keyword.

4. The utterance imaging device according to claim 3, wherein the predetermined condition is a condition based on a word or a sentence which is set in advance.

5. The utterance imaging device according to claim 1, wherein
the image is projected by a projection device, and
the outputting includes outputting the image in a state where the image is rotated based on a positional relationship with a center of a largest ellipse included in a projection range of the projection device.

6. The utterance imaging device according to claim 1, wherein the instructions further cause the processor to specify one of participants as a speaker by determining that a volume of the sound continues to be larger than a threshold value set in advance for a fixed period of time.

7. The utterance imaging device according to claim 1, wherein the instructions further cause the processor to determine the position to which the image is output, based on a circumference of a largest ellipse within a projection range of a projection device.

8. The utterance imaging device according to claim 1, wherein the instructions further cause the processor to
compare a sound volume of a whole conversation with a threshold value, and
set an utterance in a certain period to be an object from which the keyword is extracted, the certain period being in which the sound volume of the whole conversation exceeds the threshold value or is less than the threshold value.

9. The utterance imaging device according to claim 1, wherein the outputting includes outputting a new image related to one of the plurality of speakers in a state where a past image related to the one of the plurality of speakers is deleted and an image related to another of the plurality of speakers is left.

10. The utterance imaging device according to claim 1, wherein the outputting includes outputting a new image related to one of the plurality of speakers in a state where the position of a past image related to the one of the plurality of speakers is shifted.

11. An utterance imaging method comprising, at a computer:
determining positions of a plurality of speakers;
detecting sounds from at least one speaker of the plurality of speakers;
determining a closest speaker to the detected sounds, the closest speaker being determined from among the plurality of speakers;
determining sounds from the closest speaker;
extracting from the sounds from the closest speaker, using machine learning, a keyword from character strings recognized as sounds from an utterance, the character strings recognized as sounds comprising a vector space of character strings constructed using machine learning, the keyword having a relevance to a feature common to all of the plurality of speakers;
acquiring an image based on the extracted keyword; and
outputting the image to a position corresponding to the closest speaker related to the utterance, wherein the outputting the image includes outputting the image in a state where the image is rotated to align with the determined position of a speaker other than the closest speaker from among the plurality of speakers.

12. A non-transitory computer readable medium storing a program causing a computer to function as the utterance imaging device according to claim 1.

13. A system comprising:
at least one sound collecting device configured to detect sounds;
a display device configured to display at least one image;
an utterance imaging device connected to each of the at least one sound collecting device and the display device, the utterance imaging device configured to:
determine positions of a plurality of speakers;
receive sounds from at least one speaker of the plurality of speakers, the sounds being detected by the at least one sound collecting device;
determine a closest speaker to the detected sounds, the closest speaker being determined from among the plurality of speakers;
determine sounds from the closest speaker;
extract from the sounds from the closest speaker, using machine learning, a keyword from character strings recognized as sounds from an utterance, the character strings recognized as sounds comprising a vector space of character strings constructed using machine learning, the keyword having a relevance to a feature common to all of the plurality of speakers;
acquire an image based on the extracted keyword;
output the image to a position corresponding to the closest speaker related to the utterance, wherein outputting the image includes outputting the image in a state where the image is rotated to align with the determined position of a speaker other than the closest speaker from among the plurality of speakers;
transmit the output image to the display device; and
cause the display device to display the output image.

\* \* \* \* \*